(12) United States Patent
Bruno (10) Patent No.: US 11,466,904 B2
(45) Date of Patent: Oct. 11, 2022

(54) ENVIRONMENTAL CONTROL SYSTEM UTILIZING CABIN AIR TO DRIVE A POWER TURBINE OF AN AIR CYCLE MACHINE AND UTILIZING MULTIPLE MIX POINTS FOR RECIRCULATION AIR IN ACCORDANCE WITH PRESSURE MODE (71) Applicant: Hamilton Sundstrand Corporation, Windsor Locks, CT (US)

(72) Inventor: Louis J. Bruno, Ellington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 688 days.

(21) Appl. No.: 15/136,533

(22) Filed: Apr. 22, 2016

(65) Prior Publication Data
US 2016/0231031 A1 Aug. 11, 2016

Related U.S. Application Data (63) Continuation-in-part of application No. 14/553,012, filed on Nov. 25, 2014, now Pat. No. 10,549,860.

(51) Int. Cl.
*F25B 13/00* (2006.01)
*B64D 13/08* (2006.01)
(Continued)

(52) U.S. Cl.
CPC ............. *F25B 13/00* (2013.01); *B64D 13/06* (2013.01); *B64D 13/08* (2013.01); *F02C 7/141* (2013.01);
(Continued)

(58) Field of Classification Search
CPC ......... F25B 13/00; B64D 13/06; B64D 13/08; B64D 2013/0662; B64D 2013/0688; B64D 2013/0618; F02C 7/141; Y02T 50/56
See application file for complete search history.

(56) References Cited

U.S. PATENT DOCUMENTS 4,021,215 A     5/1977  Rosenbush et al.
4,209,993 A  *  7/1980  Rannenberg ........... B64D 13/06
                                                    62/80
(Continued)

FOREIGN PATENT DOCUMENTS

CN      1060270 A      4/1992
CN    101743166 A      6/2010
(Continued)

OTHER PUBLICATIONS

EPSR for EP Application No. 14182692.5, dated Feb. 5, 2015, 6 pages.
(Continued)

*Primary Examiner* — Henry T Crenshaw
(74) *Attorney, Agent, or Firm* — Cantor Colburn LLP (57) ABSTRACT A system is provided. The system includes an inlet providing a first medium; an inlet providing a second medium; a compressing device including a compressor and a turbine; and at least one heat exchanger located downstream of the compressor. The compressing device is in communication with the inlet providing the first medium. The turbine is downstream of the compressor. An outlet of the at least one heat exchanger is in fluid communication with an inlet of the compressor and an inlet of the turbine.

14 Claims, 7 Drawing Sheets (51) Int. Cl.
*F02C 7/141* (2006.01)
*B64D 13/06* (2006.01)

(52) U.S. Cl.
CPC ............... *B64D 2013/0618* (2013.01); *B64D 2013/0662* (2013.01); *B64D 2013/0688* (2013.01); *Y02T 50/50* (2013.01)

(56) References Cited

U.S. PATENT DOCUMENTS

| | | | |
|---|---|---|---|
| 4,779,644 A | 10/1988 | Benson | |
| 5,014,518 A | 5/1991 | Thomson et al. | |
| 5,086,622 A * | 2/1992 | Warner | B64D 13/06 62/88 |
| 5,461,882 A * | 10/1995 | Zywiak | B64D 13/06 62/401 |
| 5,701,755 A | 12/1997 | Severson et al. | |
| 5,704,218 A | 1/1998 | Christians et al. | |
| 5,967,461 A * | 10/1999 | Farrington | B64D 13/06 244/118.5 |
| 6,041,615 A | 3/2000 | Ostersetzer et al. | |
| 6,065,302 A | 5/2000 | Sada et al. | |
| 6,148,622 A | 11/2000 | Sanger | |
| 6,193,878 B1 | 2/2001 | Morse et al. | |
| 6,199,387 B1 | 3/2001 | Sauterleute | |
| 6,381,969 B1 | 5/2002 | Afeiche et al. | |
| 6,427,471 B1 | 8/2002 | Ando et al. | |
| 6,457,318 B1 | 10/2002 | Lui et al. | |
| 6,484,518 B1 | 11/2002 | Laugt | |
| 6,883,335 B2 | 4/2005 | Axe et al. | |
| 7,017,365 B2 | 3/2006 | Haas et al. | |
| 7,171,819 B2 | 2/2007 | Lui | |
| 7,322,202 B2 | 1/2008 | Zywiak et al. | |
| 7,334,423 B2 | 2/2008 | Bruno et al. | |
| 7,607,318 B2 | 10/2009 | Lui et al. | |
| 7,797,962 B2 | 9/2010 | Kresser et al. | |
| 7,849,702 B2 | 12/2010 | Parikh | |
| 7,975,499 B2 | 7/2011 | Defrancesco | |
| 8,418,495 B2 | 4/2013 | Merritt et al. | |
| 9,146,004 B2 | 9/2015 | Mayo et al. | |
| 9,169,023 B2 | 10/2015 | Mayo et al. | |
| 9,205,925 B2 | 12/2015 | Bruno et al. | |
| 9,487,300 B2 | 11/2016 | Klimpel et al. | |
| 9,669,936 B1 | 6/2017 | Fiterman et al. | |
| 2004/0014419 A1 * | 1/2004 | Lents | B64D 13/06 454/237 |
| 2004/0194493 A1 | 10/2004 | Army, Jr. et al. | |
| 2005/0011214 A1 | 1/2005 | Ratliff | |
| 2005/0115249 A1 | 6/2005 | Haas et al. | |
| 2006/0162371 A1 | 7/2006 | Lui et al. | |
| 2008/0264084 A1 * | 10/2008 | Derouineau | B64D 13/06 62/172 |
| 2011/0016863 A1 | 1/2011 | Ernst | |
| 2013/0133348 A1 | 5/2013 | Squier | |
| 2014/0166812 A1 | 6/2014 | Ji | |
| 2014/0326010 A1 | 11/2014 | Kawakami et al. | |
| 2015/0065025 A1 | 3/2015 | Bruno et al. | |
| 2015/0107261 A1 | 4/2015 | Moes et al. | |
| 2015/0251765 A1 | 9/2015 | Jonqueres et al. | |
| 2015/0307183 A1 | 10/2015 | Bruno et al. | |
| 2015/0307196 A1 | 10/2015 | Bruno | |
| 2016/0144965 A1 | 5/2016 | Bruno et al. | |

FOREIGN PATENT DOCUMENTS

| | | |
|---|---|---|
| CN | 103562067 A | 2/2014 |
| CN | 103946111 A | 7/2014 |
| CN | 104890878 A | 9/2015 |
| EP | 1327582 A1 | 7/2003 |
| EP | 2937287 A1 | 10/2015 |
| EP | 3025962 A1 | 6/2016 |
| EP | 3095702 A1 | 11/2016 |
| EP | 3103721 A1 | 12/2016 |
| GB | 2355520 A | 4/2001 |

OTHER PUBLICATIONS

EPSR for EP Application No. 15189018.3, dated Feb. 23, 2016, 7 pages.
EP SR, dated Feb. 23, 2016, Application No. 15189018.3-1754.
Search Report dated Jul. 27, 2017 in EP Application No. 17167776, 8 pages.
First Office Action and Search Report (with English Translation); Chinese Application No. 201510646904.6; dated Sep. 5, 2018; 19 Pages.
First Office Action; Chinese Application No. 201710265122.7; International Filing Date: Oct. 9, 2015; dated Dec. 30, 2020; 12 pages with translation.

* cited by examiner

ENVIRONMENTAL CONTROL SYSTEM UTILIZING CABIN AIR TO DRIVE A POWER TURBINE OF AN AIR CYCLE MACHINE AND UTILIZING MULTIPLE MIX POINTS FOR RECIRCULATION AIR IN ACCORDANCE WITH PRESSURE MODE

BACKGROUND

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

SUMMARY

According to one embodiment, a system is provided. The system includes an inlet providing a first medium; an inlet providing a second medium; a compressing device including a compressor and a turbine; and at least one heat exchanger located downstream of the compressor. The compressing device is in communication with the inlet providing the first medium. The turbine is downstream of the compressor. An outlet of the at least one heat exchanger is in fluid communication with an inlet of the compressor and an inlet of the turbine.

Additional features and advantages are realized through the techniques of the embodiments herein. Other embodiments and aspects are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide an environmental control system that leverages cabin air to increase a pressure of lower engine bleed air that is being bled at a pressure level slightly above cabin pressure to, thus, provide cabin pressurization and cooling at a high engine fuel burn efficiency.

In general, embodiments disclosed herein may include a system comprising one or more heat exchangers and a compressing device. A medium, flowing through the one or more heat exchangers. The medium can be bled from a low-pressure location of an engine through the one or more heat exchangers into a chamber. The low-pressure location of the engine provides the medium at an initial pressure level near a pressure of the medium once it is in the chamber (e.g., chamber pressure). The medium may be slightly above or slightly below the chamber pressure. Bleeding the medium at such a low pressure from the low-pressure location causes less of a fuel burn than bleeding air from a higher pressure location. Yet, because the medium is starting at this relatively low initial pressure level and because a drop in pressure occurs over the one or more heat exchangers, the medium can drop below the chamber pressure while the medium is flowing through the one or more heat exchangers. When the pressure of the medium is below the pressure of the chamber the medium does not flow into the chamber to provide pressurization and temperature conditioning.

Thus, the compressing device, in communication with the one or more heat exchangers, is utilized to regulate a pressure of the medium flowing through the one or more heat exchangers to ensure there is sufficient pressure to provide the medium into the chamber. The compressing device utilizes the medium itself as a power source to regulate the pressure of the medium. Yet, the medium at the initial pressure level bleed from the engine alone may not supply enough power to the compressing device to ensure that the pressure of the medium is boosted above the chamber pressure to ensure the flow of the medium into the chamber. The compressing device can further include a power turbine that utilizes exhaust air from the chamber to provide additional power to the compressing device. In this way, the compressing device with the turbine regulates/increases the pressure of the medium as it flows through the one or more heat exchangers to allow a connection of the system to the low-pressure location source of bleed air.

For example, in view of an aircraft embodiment, air cycle machine (e.g., the compressing device) of cabin air conditioning system (e.g., environmental control system) utilizes, as a source of energy, a pressure of air bleed (e.g., bleed air, which can be referred to as outside air or fresh air) from an engine of an aircraft. The turbine is added to the air cycle machine of an aircraft and can utilize, as a source of energy, a pressure of air in a cargo compartment, cabin, or flight deck (e.g., cabin pressure in general) to provide supplemental power to the air cycle machine. The combined sources of energy are utilized to prepare the bleed air by the air cycle machine so that the cabin air conditioning system can utilize bleed air from the engine of the aircraft at the initial pressure level described above, i.e., a pressure level slightly above or below the cabin pressure. Examples of values of the initial pressure level include pressure levels greater than 5 psia above the cabin pressure, at 5 psia, or between the cabin pressure and 5 psia (e.g., cabin pressure is generally at 12 psia).

Figure 1:
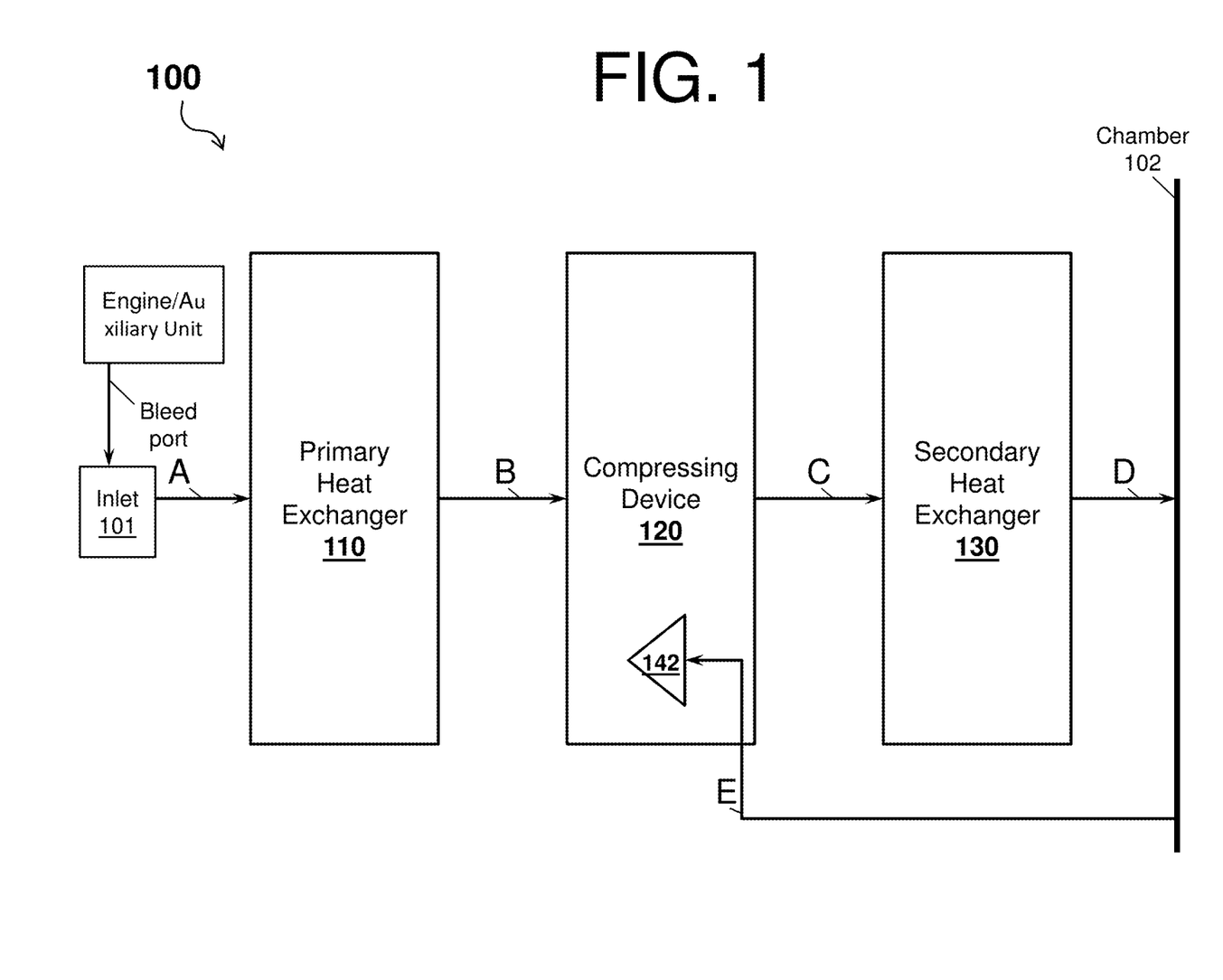
FIG. 1 is a diagram of an schematic of an environmental control system according to an embodiment.

FIG. 1 illustrates a system 100 with a medium (e.g., air) flowing from an inlet 101 to a chamber 102. In the system 100, the medium flows from the inlet 101 to a primary heat exchanger 110 (e.g., solid arrow A), from the primary heat exchanger 110 to a compressing device 120 (e.g., solid arrow B), from the compressing device 120 to a secondary heat exchanger 130 (e.g., solid arrow C), and from the secondary heat exchanger 130 to the chamber 102 (e.g., solid arrow D).

The medium, in general, can be air, while other examples include gases, liquids, fluidized solids, or slurries. When the medium is being provided from the chamber 102 of the system 100, the medium is referred to herein as recirculated air. When the medium is being provided by an engine connected to the system 100, such as from the inlet 101, the medium can be referred to herein as bleed air. With respect to bleed air, a low-pressure location of the engine (or an auxiliary power unit) can be utilized to provide the medium at an initial pressure level near a pressure of the medium once it is in the chamber 102 (e.g., chamber pressure, also referred to as cabin pressure in the aircraft example).

In one embodiment, the system 100 is any environmental control system of a vehicle, such as an aircraft or watercraft, that provides air supply, thermal control, and cabin pressurization for a crew and passengers of the vehicle (e.g., a cabin air conditioning system of an aircraft). The system may also include avionics cooling, smoke detection, and fire suppression. For example, on an aircraft, air is supplied to the environmental control system by being "bled" from a compressor stage of a gas turbine engine. The temperature and pressure of this "bleed air" varies widely depending upon which compressor stage and a revolutions per minute of the gas turbine engine. To achieve the desired temperature, the bleed-air is cooled as it is passed through at least one heat exchanger (e.g., exchangers 110, 130). To achieve the desired pressure, the bleed-air is compressed as it is passed through a compressing device (e.g., compressing device 120).

With respect to the vehicle being an aircraft, the system 100 is an environmental control system that supplies pressurized air (e.g., a medium) to any environment, such as a cabin (e.g., chamber 102) and flight deck of an aircraft, for both comfort and pressurization. The pressurized air supplied by the ECS may originate from a compressor stage of an engine (e.g., via a bleed air system) and/or directly from exterior air (e.g., via a ram air system). The interaction of the ECS with the engine in a bleed air system influences how much fuel burn by the engine is needed to perform operations, such as supplying pressurized air, related to that interaction. For example, in a bleed air system of an aircraft, air is extracted from an engine core at a pre-defined stage location in an engine compressor region of the engine core to provide cooling air to an aircraft cabin.

Heat exchangers (e.g., a primary heat exchanger 110 and a secondary heat exchanger 130) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example above, air forced by a fan (e.g., via push or pull methods) is blown across the heat exchanger at a variable cooling airflow to control the final air temperature of the bleed-air.

The compressing device 120 (e.g., an air cycle machine as described below) is a mechanical device that regulates a pressure of a medium (e.g., increasing the pressure of a gas) via a compressor. Examples of the compressor of the compressing device 120 include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

In operation, the primary heat exchanger 110 of the system 100 receives (e.g., arrow A) a medium at a first pressure and first temperature. The primary heat exchanger 110 then cools the medium, which lowers the first pressure to a second pressure.

Next, the medium is communicated (e.g., arrow B) to the compressing device 120 that regulates a pressure of a medium flowing within the system 100, raises the second pressure of the medium to a third pressure, which has a higher value than the second pressure. Therefore, in the system 100, the compressing device 120 boosts the pressure of the medium as it exits the primary heat exchanger 110 (e.g., arrow B), so that the secondary heat exchanger 130 may receive the medium at its input at a higher pressure (e.g., arrow C). As shown in FIG. 1, the compressing device 120 includes a turbine 142 that utilizes exhaust from the chamber 102 (e.g., arrow E) to provide additional power to the compressing device 120.

It should be understood that a single heat exchanger embodiment could be implemented consistent with the above system 100, where the compressor boost the pressure of the medium prior to, or after, the medium flows through the single heat exchanger.

Returning to FIG. 1, the medium is then communicated (e.g., arrow C) to the secondary heat exchanger 130 that cools the medium again, before the medium exits (e.g., arrow D) to the chamber 102.

With respect to an aircraft example, FIG. 1 is discussed below. In general, bleeding air from a low-pressure location causes less of a fuel burn than bleeding air from a high pressure location. Yet, because a drop in pressure occurs over the system 100, when air is bled from a low-pressure location, the bleed-air flowing from the inlet 101 to the chamber 102 will observe an internal pressure drop below a final pressure (the pressure required to flow into the chamber). If the air pressure in the system 100 drops below a pressure that is desired at the chamber 102 (e.g., the final pressure), then the system 100 will cease to supply the bleed air to the chamber 102, and in turn the cabin of the aircraft. This is why the compressing device 220 is employed by the system 100, so as to ensure that the bleed air is boosted above the final pressure before being passed onto the secondary heat exchanger 130 and onto the chamber 102.

Further, the system 100 may be designed to gain even higher fuel burn efficiencies by extracting bleed air from a low-pressure location of the engine where the pressure is at a level slightly above the pressure desired at the chamber 102 (e.g., the final pressure). As indicated above, because the power source for the system 100 is the bleed air itself, the bleed air at this low-pressure location of the engine may not supply enough power to the compressing device 120 to boost the bleed air above the final pressure before being passed onto the secondary heat exchanger. Thus, the turbine 142 is added to the compressing device 120 and air from the chamber 102 is utilized to drive the turbine 142, such that supplement power is provided to the compressing device 120. That is to say that turbine 142 increases the power available to compressing device 120, by extracting power from the pressure gradient between the air inside chamber 102 and the ambient air pressure outside of chamber 102.

In this way, air from the chamber 102 in addition to the bleed air is used to drive the compressing device 120, so that the highest fuel efficiency may be gained due to the bleed air being bled from the lowest possible pressure location of the engine (e.g., at a level slightly above typical cabin pressure e.g., such as 1 psig or more). It may be possible, in some system configurations, to bleed air from the engine that is below the required pressure to pressurize the cabin (e.g. −1 psig) and use energy extracted from this bleed air and energy extracted other air flowing from a cabin pressure gradient to an external ambient gradient to boost the pressure in the bleed air itself (using the compressor of the compressing device), so that a resulting conditioned pressurized air is provided to the cabin.

Figure 2:
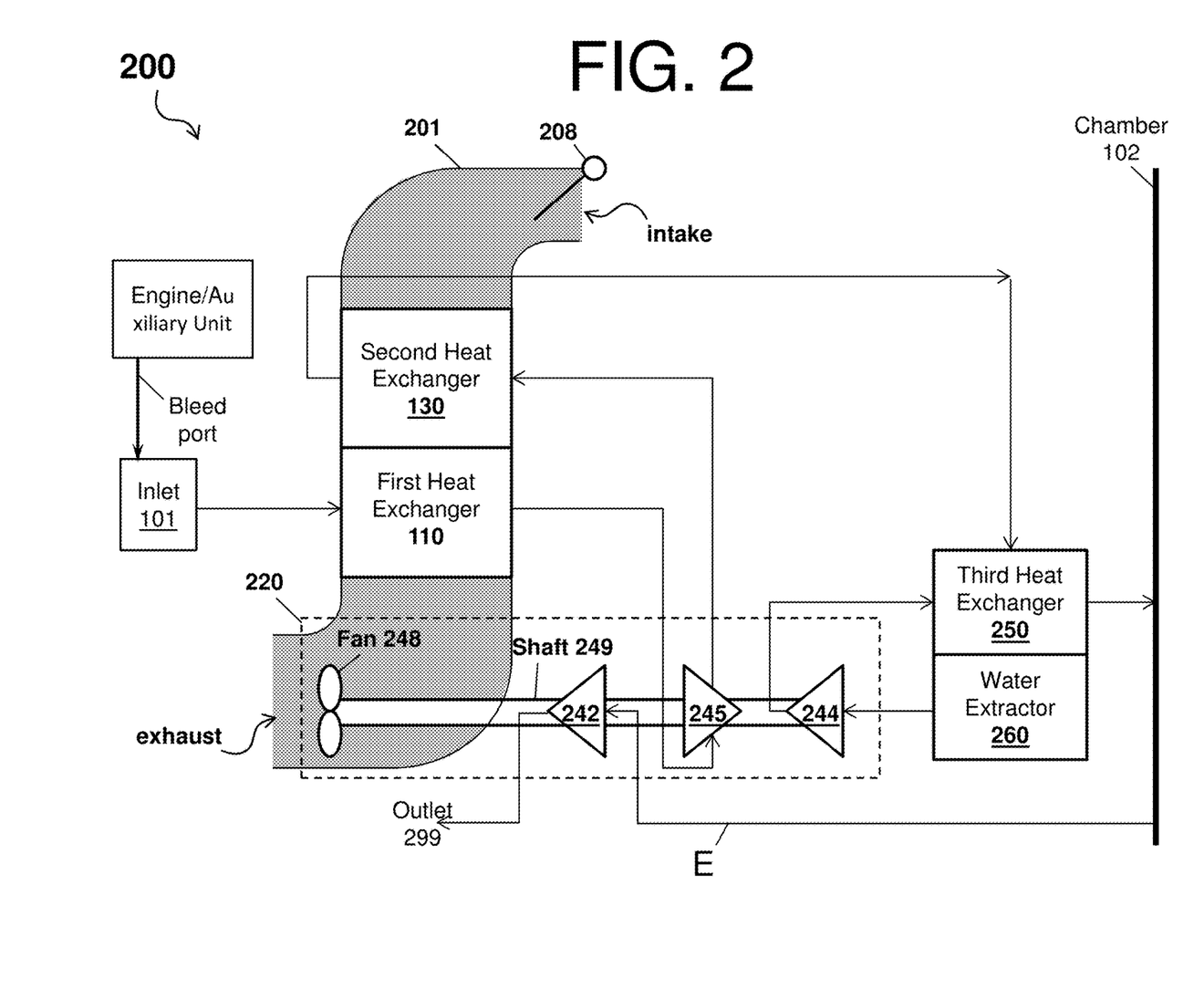
FIG. 2 is operation example of an environmental control system according to an embodiment.
Figure 3:
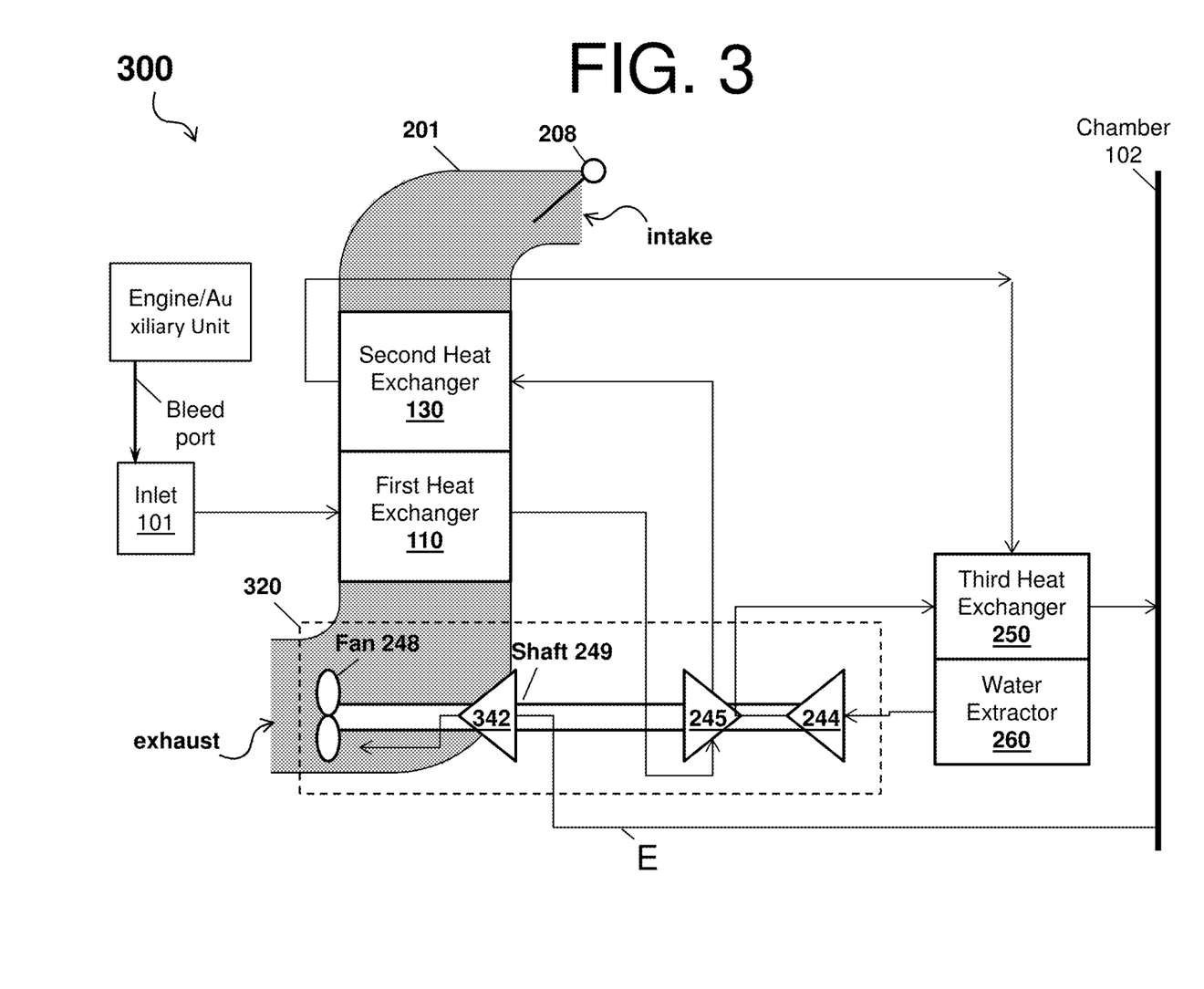
FIG. 3 is operation example of an environmental control system according to another embodiment.

The system 100 of FIG. 1 will now be described with reference to FIGS. 2-3, in view of the aircraft example above. FIG. 2 illustrates an environmental control system 200 (e.g., an embodiment of system 100) that includes, in addition to the previously described items of FIG. 1, a shell 201, a valve 208, the compressing device 220 (that includes a power turbine 242, a turbine 244, a compressor 245, a fan 248, and a shaft 249), a third heat exchanger 250, and a water extractor 260, each of which are connected via tubes, pipes, ducts and the like, such that bleed air is accepted at inlet 101 from a low-pressure location of an engine of an aircraft at an initial flow rate, pressure, and temperature and provided to the chamber 102 (e.g., cabin, flight deck, etc.) at a final flow rate, pressure, and temperature. In this way, the credentials of the bleed air at the chamber 102 (e.g., the final flow rate, pressure, and temperature) enable the aircraft to receive pressurized and cooled air from the environmental control system 200.

The environmental control system 200 is an example of an environmental control system of an aircraft that provides air supply, thermal control, and cabin pressurization for the crew and passengers of the aircraft. The shell 201 is an example of a ram chamber of a ram system which uses dynamic air pressure created by an aircraft in motion to increase a static air pressure inside of the shell.

Valves, such as the valve 208, are devices that regulate, direct, and/or control a flow of a medium (e.g., gases, liquids, fluidized solids, or slurries, such as bleed-air) by opening, closing, or partially obstructing various passageways within the tubes, pipes, etc. of the environmental control system 200. Valves may be operated by actuators such that the flow rates of any medium in any portion of the environmental control system 200 may be regulated to a desired value. For example, the valve 208 enables the intake of ambient air external to the aircraft into the shell 201, such that the ambient air may pass through the first and second heat exchangers and cool the bleed-air before exiting as an exhaust (e.g., the method of intake may be a pull method by a fan 248 driven by the shaft 249 of the compressing device 220 or a ram method as described above).

The compressing device 220 (which is an example embodiment of the compressing device 120 of FIG. 1) can be an air cycle machine that controls and manipulates the medium (e.g., increasing the pressure of bleed air). The turbine 244 is a mechanical device that drives the compressor 245 and fan 248 via the shaft 249. The compressor 245 is a mechanical device that regulates a pressure of the bleed-air received from the first heat exchanger. The fan 248 is a mechanical device that forces via push or pull methods air through the shell 201 across the heat exchangers at a variable cooling airflow. The turbine 244, the compressor 245, and fan 248 together regulate pressure and illustrate, for example, that the air cycle machine (e.g., the compressing device 220) may operate as a three-wheel air cycle machine. In turn, the three-wheel air cycle machine includes the addition of the power turbine 242 that utilizes exhaust from the chamber 102 (e.g., arrow E) to provide additional power to the compressing device 220. Note that the addition of the turbine does not change the three-wheel air cycle machine into a four-wheel condensing cycle, because the two turbines 242, 244 are in series and the four-wheel condensing cycle does not use the exhaust from the chamber 102 as a source of energy to drive the cycle. The exhaust from the chamber 102 is then forwarded to outlet 299 (e.g., releases to ambient air). Note that the compressing device 220 can be known as an air conditioning pack or a pack for performing thermodynamic work. In an embodiment, the pack can also begin at a mass flow control valve at the inlet 101 and conclude as air exits to the chamber 102.

The third heat exchanger 250 is an example of a heat exchanger as described herein. The water extractor 260 is a mechanical device that performs a process of taking water from any source, such as bleed-air, either temporarily or permanently.

In view of the above, it is noted that the location of the turbines 142, 242 may vary. FIG. 3 illustrates an environmental control system 300 (e.g., another embodiment of system 100) that includes, in additional to the previously described items of FIGS. 1 and 2, a compressing device 320 including a power turbine 342 optimally placed with respect to a wall of the shell 201. In this regard, for example, the optimum power turbine placement on three- and four-wheel air cycle machines will provide reduced fan power absorption at altitude by increasing fan 248 flow and adding pre-swirl to a fan rotor inlet, thereby providing an enhanced pressure boost; removal of power turbine exhaust ducting and discharge requirements; eliminating potential power turbine exhaust icing issues; ensuring a minimal air cycle machine length in a compact package; and providing power turbine rotor cooling due to the low fan static pressure when power turbine is turned off during ground operation (draws cooling flow from the cabin); etc.

Additional embodiments of the turbines 142, 242, 342 may include an air cycle machine with an axial power turbine arrangement added to a three-wheel cycle (e.g., turbine, compressor, power turbine, and fan arrangement), a four wheel cycle (e.g., second turbine, first turbine, compressor, power turbine, and fan arrangement), etc., where an axial power turbine utilizes and discharges to ambient pressure the chamber 102 exhaust. This embodiment includes the benefits of the axial power turbine having a minimal impact to a length of the air cycle machine (e.g., enabling a compact package) and the axial power turbine discharging to a ram fan inlet (e.g., which can increase fan flow and fan inlet pre-swirl from turbine, where an exhaust can reduce fan power absorption at altitude, which can bleed pressure requirements, when a turbine exhaust ducting may not be required, and where a turbine exit icing can be avoided with hot fan air).

Additional embodiments of the turbines 142, 242, 342 may include an air cycle machine with a radial power turbine arrangement added to a three-wheel cycle (e.g., turbine, compressor, power turbine, and fan arrangement), a four wheel cycle (e.g., second turbine, first turbine, compressor, power turbine, and fan arrangement), etc., where the radial power turbine utilizes and discharges to ambient pressure the chamber 102 exhaust. This embodiment includes the benefits of a tip turbine fan and reduces a length of the air cycle machine (e.g., which enables a compact package).

Additional embodiments of the turbines 142, 242, 342 may include an air cycle machine with a power tip turbine fan arrangement added to a three-wheel cycle (e.g., turbine, compressor, and power turbine/fan arrangement), a four wheel cycle (e.g., second turbine, first turbine, compressor, and power turbine/fan arrangement), etc., where the power tip turbine fan utilizes and discharges to ambient pressure the chamber 102 exhaust. This embodiment includes the benefits of utilizing a radial power turbine, which has a minimal cost (e.g., which enables enabling an inexpensive package). Further, the radial power turbine can discharge to a ram fan inlet, while the power turbine rotor performs cooling during ground operation.

Figure 4:
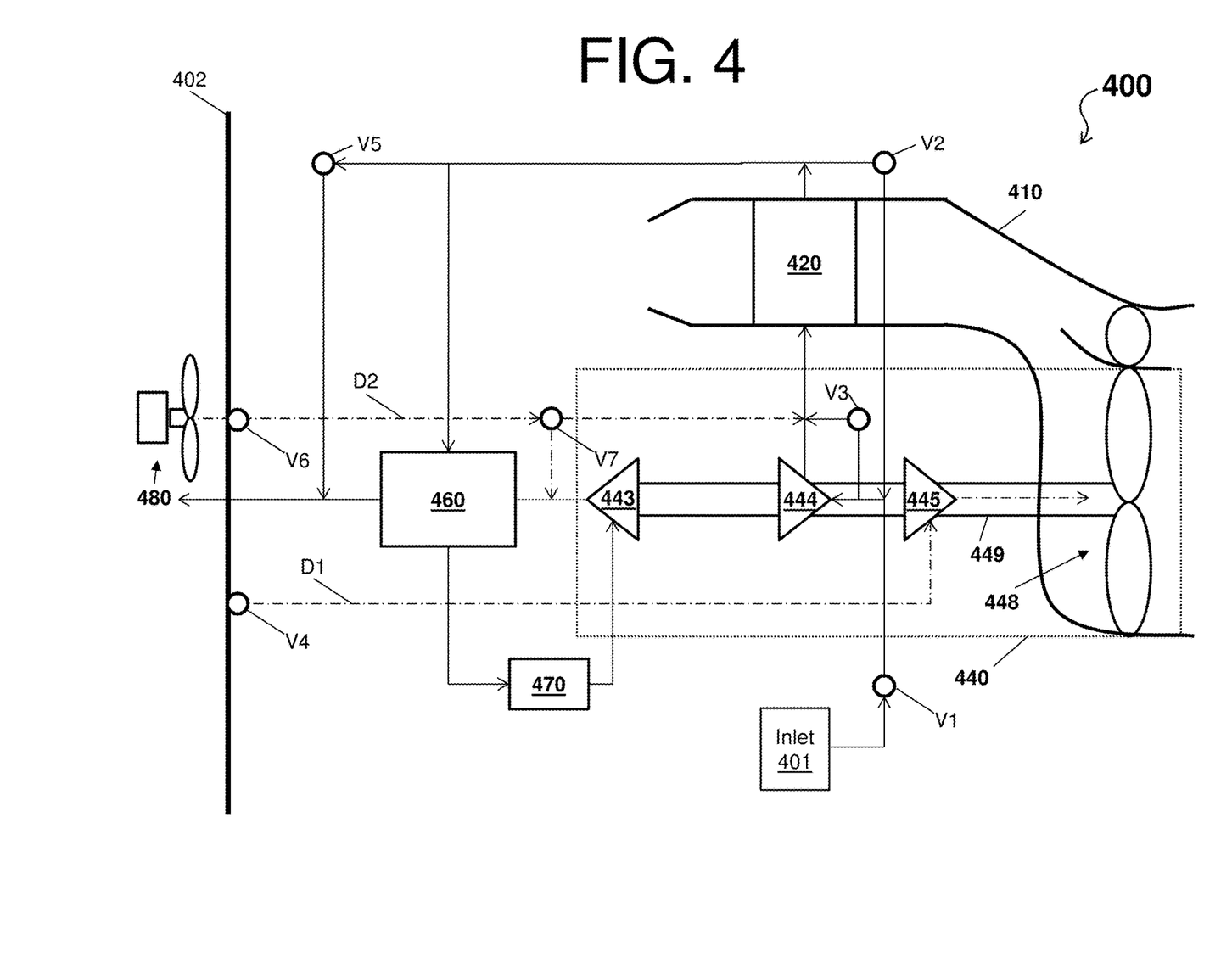
FIG. 4 is operation example of an environmental control system according to another embodiment.

The system 100 of FIG. 1 will now be described with reference to FIG. 4, in view of the aircraft example. FIG. 4 depicts a schematic of a system 400 (e.g., an embodiment of system 100) as it could be installed on an aircraft.

A system will now be described with respect to a conventional bleed air driven environmental control system of an airplane utilizing a contemporary cabin three-wheel air conditioning system. The conventional bleed air driven air environmental control system receives bleed air at a pressure between 30 psia (e.g., during cruise) and 45 psia (e.g., on the ground). In the conventional bleed air driven air environmental control system, during a hot day ground operation, a centrifugal compressor of the contemporary cabin three-wheel air conditioning system receives nearly all of the flow of the bleed air at a pressure of approximately 45 psia. Further, during the hot day cruise operation, the centrifugal compressor of the contemporary cabin three-wheel air conditioning system receives only a portion of the flow of the bleed air at a pressure of 30 psia. The remainder of the bleed air bypasses the centrifugal compressor via the contemporary cabin three-wheel air conditioning system bypass valve and is sent to the cabin.

In contrast to the conventional bleed air driven environmental control system utilizing the contemporary cabin three-wheel air conditioning system, the system 400 is an example of an environmental control system of an aircraft that provides air supply, thermal control, and cabin pressurization for the crew and passengers of the aircraft at a high engine fuel burn efficiency. The system 400 illustrates bleed air flowing in at inlet 401 (e.g., off an engine of an aircraft at an initial flow rate, pressure, temperature, and humidity), which in turn is provided to a chamber 402 (e.g., cabin, flight deck, etc.) at a final flow rate, pressure, temperature, and humidity. The bleed air can recirculate back through the system 400 from the chamber 402 (herein cabin discharge air and recirculated air are represented by the dot-dashed lines D1 and D2, respectively) to drive and/or assist the system 400.

The system 400 in includes a shell 410 for receiving and directing ram air through the system 400. Note that based on the embodiment, an exhaust from the system 400 can be sent to an outlet (e.g., releases to ambient air through the shell 410). Note also that the system 400 can work with bleed pressures near a chamber pressure during cruise.

The system 400 further illustrates valves V1-V7, a heat exchanger 420, an air cycle machine 440 (that includes a turbine 443, a compressor 444, a turbine 445, a fan 448, and a shaft 449), a condenser 460, a water extractor 470, and a recirculation fan 480, each of which is connected via tubes, pipes, and the like. Note that the heat exchanger 420 is an example of one of the heat exchangers (110 and 130) as described herein. Further, in an embodiment, the heat exchanger 420 can be the secondary heat exchanger 130 that is downstream of the primary heat exchanger 110 (not shown in FIG. 4). Note also that the air cycle machine 440 is an example of the compressing devices (120 and 220) as described herein.

The air cycle machine 440 extracts or works on the medium by raising and/or lowering pressure of the medium and by raising and/or lowering temperature of the medium. The compressor 444 is a mechanical device that raises the pressure of the bleed-air received from the inlet 401. The turbines 443, 445 are mechanical devices that drive the compressor 444 and the fan 448 via the shaft 449. The fan 448 is a mechanical device that can force via push or pull methods air through the shell 410 across the secondary heat exchanger 420 at a variable cooling airflow. Thus, the turbines 443, 445, the compressor 444, and the fan 448 together illustrate, for example, that the air cycle machine 440 may operate as a four-wheel air cycle machine that utilizes air recirculated or discharged from the chamber 402 (e.g., in an embodiment, the air cycle machine 440 utilizes chamber discharge air to perform compressing operations, as indicated by the dot-dashed line D1).

The condenser 460 is particular type of heat exchanger. The water extractor 470 is a mechanical device that performs a process of taking water from any source, such as bleed-air. The recirculation fan 480 is a mechanical device that can force via a push method recirculation air into the system 400, as indicated by dot-dashed arrow D2.

In a high pressure mode of operation of the system 400, high-pressure high-temperature air is received from the inlet 401 through the valve V1. The high-pressure high-temperature air enters the compressor 444. The compressor 444 pressurizes the high-pressure high-temperature air and in the process heats this air. This air then enters the heat exchanger 420 and is cooled by ram air to produce cool high pressure air (e.g., at approximately ambient temperature). This cool high pressure air enters into the condenser 460 and the water extractor 470, where the air is cooled and the moisture is removed. The cool high pressure air enters the turbine 443, where it is expanded and work is extracted. The work extracted by the turbine 443 can drive both the compressor 444 and the fan 448. The fan 448 is used to pull a ram air flow through the heat exchanger 420. Also, by expanding and extracting work from the cool high pressure air, the turbine 443 produces cold bleed air. After leaving the turbine 443, the cold bleed air is mixed at a mixing point with recirculation air D2 provided by the fan 480 through the valves V6 and V7. The mixing point in this case can be referred to as downstream of the compressing device 440, downstream of the compressor 444, downstream of the turbine 443, and/or upstream a low pressure side of the condenser 460. When applied to an air conditioning pack, the mixing point can be referred to as inside the pack. By mixing the cold bleed air with the recirculation air, the system 400 utilizes the recirculation air, which is warm and moist, to level out the cold bleed air (e.g., raise the temperature). This leveled out bleed air, in turn, enters a low pressure side of the condenser 460, cools the bleed air on the high pressure side of the condenser 460, and is sent to condition the chamber 402.

Note that when operating in the high pressure mode, it is possible for the air leaving the compressor 444 to exceed an auto-ignition temperature of fuel (e.g., 400 F for steady state and 450 F for transient). In this situation, air from an outlet of the heat exchanger 420 is ducted by the valve V2 to an inlet of the compressor 444. This lowers an inlet temperature of the air entering the inlet of the compressor 444 and, as a result, the air leaving the compressor 444 is below the auto-ignition temperature of fuel.

The high pressure mode of operation can be used at flight conditions when engine pressure is adequate to drive the cycle or when a temperature of the chamber 402 demands it. For example, conditions, such as ground idle, taxi, take-off, climb, and hold conditions would have the air cycle machine 440 operating in the high pressure mode. In addition, extreme temperature high altitude cruise conditions could result in the air cycle machine 440 operating in the high pressure mode.

In a low pressure mode of operation, the bleed air from the inlet 401 bypasses the air cycle machine 440 via the valve V3 and mixes at a mixing point with the recirculation air D2 provided by the fan 480 through the valves V6 and V7 to produce mixed air. The mixing point in this case can be referred to as downstream of the compressing device 440, downstream of the compressor 444, and/or upstream the heat exchanger 420. When applied to an air conditioning pack, the mixing point can be referred to as inside the pack. The mixed air goes directly through the heat exchanger 420, where it is cooled by ram air to the temperature required by the chamber 402, to produce cool air. The cool air then goes directly into the chamber 402 via the valve V5. Further, the chamber discharge air D1 is used to keep the air cycle machine 440 turning at a minimum speed. That is, chamber discharge air D1 flowing from the chamber 402 through the valve V4 enters and expands across the turbine 445, so that work is extracted. This work is utilized to turn the air cycle machine 440 at, for example, a minimum speed of approximately 6000 rpm. The air exiting the turbine 445 is then dumped overboard through the shell 410.

The low pressure mode can be used at flight conditions where the pressure of the bleed air entering the air cycle machine 440 is greater than approximately 1 psi above the chamber pressure (e.g., conditions at cruise where altitudes are above 30,000 ft. and conditions at or near standard ambient day types).

In a boost pressure mode of operation, the bleed air from the inlet 401 enters the compressor 444, where it is compressed and heated. The compressed and heated air from the compressor 444 mixes at a mixing point with the recirculation air D2 provided by the fan 480 through the valves V6 and V7 to produce mixed air. The mixing point in this case can be referred to as downstream of the compressing device 440, downstream of the compressor 444, and/or upstream the heat exchanger 420. When applied to an air conditioning pack, the mixing point can be referred to as inside the pack. The mixed air enters the heat exchanger 420, where it is cooled by ram air to the temperature required by the chamber 402 to produce cool air. The cool air then goes directly into the chamber 402 via the valve V5. Further, the cabin discharge air D1 is used to provide the energy to pressurize the bleed air entering the compressor 444. That is, the chamber discharge air D1 flowing from the chamber 402 through the valve V4 enters and is axpanded across the turbine 445, so that work is extracted. The amount of work extracted by the turbine 445 is enough to turn the air cycle machine 440 at the speed required by the compressor 444 to raise a pressure of the bleed air to a value that can drive the bleed air through the heat exchanger 420 and into the chamber 402.

The boost pressure mode can be used at flight conditions where the pressure of the bleed air entering the air cycle machine 440 is as low as 2.5 psi below the chamber pressure (e.g., conditions at cruise where altitudes are above 30,000 ft. and conditions at or near standard ambient day types).

Figure 5:
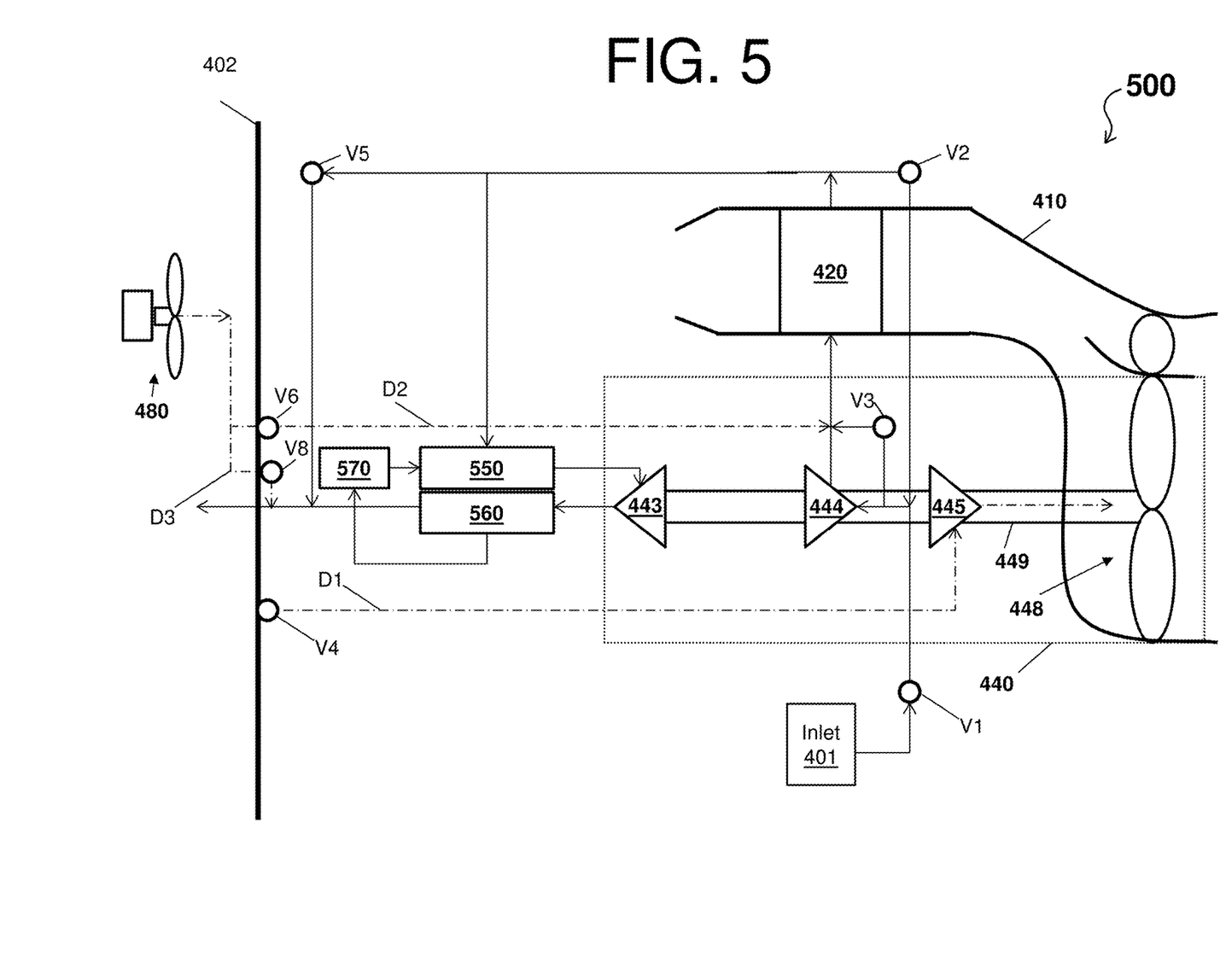
FIG. 5 is operation example of an environmental control system according to another embodiment.

The system 100 of FIG. 1 will now be described with reference to FIG. 5, in view of the aircraft example. FIG. 5 depicts a schematic of a system 500 (e.g., an embodiment of system 100) as it could be installed on an aircraft. Components of the system 500 that are similar to components of the system 400 have been reused for ease of explanation, by using the same identifiers, and are not reintroduced. Alternative components of the system 500 include a valve V8, a reheater 550, a condenser 560, and a water extractor 570, along with an alternative path for the recirculation air denoted by the dot-dashed line D3.

The reheater 550 and the condenser 560 are particular types of heat exchanger. The water extractor 570 is a mechanical device that performs a process of taking water from any source, such as bleed-air. Together, the reheater 550, the condenser 560, and/or the water extractor 570 can combine to be a high pressure water separator.

In a high pressure mode of operation, high-pressure high-temperature air is received from the inlet 401 through the valve V1. The high-pressure high-temperature air enters the compressor 444. The compressor 444 pressurizes the high-pressure high-temperature and in the process heats it. This air then enters the heat exchanger 420 and is cooled by ram air to produce cool high pressure air (e.g., at approximately ambient temperature). This cool high pressure air enters into the reheater 550, where it is cooled; through the condenser 560, where it is cooled by air from the turbine 443; through the water extractor 570, where the moisture in the air is removed; and again into the reheater 550, where the air is heated to nearly an inlet temperature at the reheater 550. The warm high pressure and now dry air enters the turbine 443, where it is expanded and work extracted. The work from the turbine 443 can drive both the compressor 444 and the fan 448. The fan 448 is used to pull ram air flow through the heat exchanger 420. After leaving the turbine 443, the cold air, typically below freezing, cools the warm moist air in the condenser 560. Downstream of the condenser 560, the cold air leaving the air cycle machine 440 mixes at a mixing point with the recirculation air D3 provided by the fan 480 through the valve V8 to produce mixed air. The mixing point in this case can be referred to as downstream of the compressing device 440, downstream of the compressor 444, downstream the heat exchanger 420, and/or downstream of the turbine 443. When applied to an air conditioning pack, the mixing point can be referred to as inside the pack. In an embodiment, the mixing point can be placed outside the pack and therefor downstream of the pack. This mixed air then sent to condition the chamber 402.

When operating in the high pressure mode, it is possible for the air leaving the compressor 444 to exceed an auto-ignition temperature of fuel (e.g., 400 F for steady state and 450 F for transient). In this situation, air from an outlet of the first pass of the heat exchanger 420 is ducted by the valve V2 to an inlet of the compressor 444. This lowers an inlet temperature of the air entering the inlet of the compressor 444 and, as a result, the air leaving the compressor 444 is below the auto-ignition temperature of fuel.

The high pressure mode of operation can be used at flight conditions when engine pressure is adequate to drive the cycle or when a temperature of the chamber 402 demands it. For example, conditions, such as ground idle, taxi, take-off, climb, and hold conditions would have the air cycle machine 440 operating in the high pressure mode. In addition, extreme temperature high altitude cruise conditions could result in the air cycle machine 440 operating in the high pressure mode.

In a low pressure mode of operation, the bleed air from the inlet 401 bypasses the air cycle machine 440 via the valve V3 and mixes at a mixing point with the recirculation air D2 provided by the fan 480 through the valve V6 to produce mixed air. The mixing point in this case can be referred to as downstream of the compressing device 440 and/or upstream of the heat exchanger 420. When applied to an air conditioning pack, the mixing point can be referred to as inside the pack. The mixed air goes directly through the heat exchanger 420, where it is cooled by ram air to the temperature required by the chamber 402 to produce cool air. The cool air then goes directly into the chamber 402 via the valve V5. Further, the chamber discharge air D1 is used to keep the air cycle machine 440 turning at a minimum speed. That is, chamber discharge air D1 flowing from the chamber 402 through the valve V4 enters and expands across the turbine 445, so that work is extracted. This work is utilized to turn the air cycle machine 440 at, for example, a minimum speed of approximately 6000 rpm. The air exiting the turbine 445 is then dumped overboard through the shell 410.

The low pressure mode can be used at flight conditions where the pressure of the bleed air entering the air cycle machine 440 is greater than approximately 1 psi above the chamber pressure (e.g., conditions at cruise where altitudes are above 30,000 ft. and conditions at or near standard ambient day types).

In a boost pressure mode of operation, the bleed air from the inlet 401 enters the compressor 444, where it is compressed and heated. The compressed and heated air from the compressor 444 mixes at a mixing point with the recirculation air D2 provided by the fan 480 through the valve V6 to produce mixed air. The mixing point in this case is downstream of the compressor 444 and/or upstream of the at least one heat exchanger 420. When applied to an air conditioning pack, the mixing point can be referred to as inside the pack. The mixed air enters the heat exchanger 420, where it is cooled by ram air to the temperature required by the chamber 402 to produce cool air. The cool air then goes directly into the chamber 402 via the valve V5. Further, the cabin discharge air D1 is used to provide the energy to pressurize the bleed air entering the compressor 444. That is, the chamber discharge air D1 flowing from the chamber 402 through the valve V4 enters and expands across the turbine 445, so that work is extracted. The amount of work extracted by the turbine 445 is enough to turn the air cycle machine 440 at the speed required by the compressor 444 to raise a pressure of the bleed air to a value that can drive the bleed air through the heat exchanger 420 and into the chamber 402.

The boost pressure mode can be used at flight conditions where the pressure of the bleed air entering the air cycle machine 440 is as low as 2.5 psi below the chamber pressure (e.g., conditions at cruise where altitudes are above 30,000 ft. and conditions at or near standard ambient day types).

Figure 6:
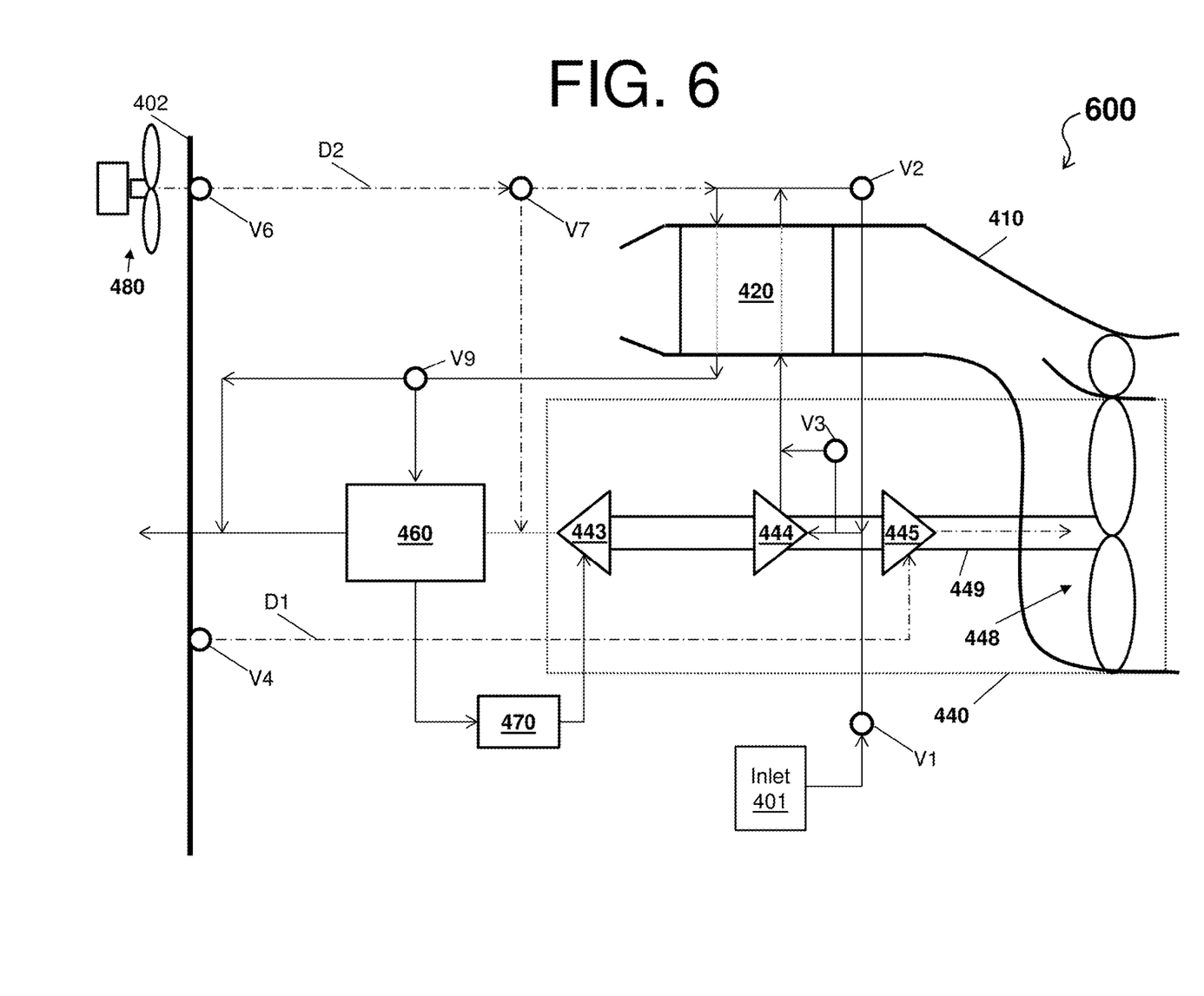
FIG. 6 is operation example of an environmental control system according to another embodiment.

The system 100 of FIG. 1 will now be described with reference to FIG. 6, in view of the aircraft example. FIG. 6 depicts a schematic of a system 600 (e.g., an embodiment of system 100) as it could be installed on an aircraft. Components of the system 500 that are similar to components of the system 400 and the system 500 have been reused for ease of explanation, by using the same identifiers, and are not reintroduced. An alternative component of the system 600 is a valve V9, along with the alternative paths depicted.

In a high pressure mode of operation, high-pressure high-temperature air is received from the inlet 401 through the valve V1. The high-pressure high-temperature air enters the compressor 444. The compressor 444 pressurizes the high-pressure high-temperature and in the process heats it. This air then enters a first pass of the heat exchanger 420 and is cooled by ram air. The air exiting the first pass of the heat exchanger 420 then enters the second pass of the heat exchanger 420 and is further cooled to produce cool high pressure air. This cool high pressure air enters through the valve V9 the condenser 460 and the water extractor 470, where the air is cooled and the moisture removed. The cool high pressure air enters the turbine 443, where it is expanded and work extracted. The work from the turbine 443 can drive both the compressor 444 and the fan 448. The fan 448 is used to pull ram air flow through the heat exchanger 420. Also, by expanding and extracting work, the turbine 443 produces cold bleed air. After leaving the turbine 443, the cold bleed air is mixed at a mixing point with the recirculation air D2 provided by the fan 480 through the valves V6 and V7. The mixing point in this case is downstream of the compressing device 440, which also can be referred to as downstream of the compressor 444 and/or downstream of the first turbine 443. By mixing the cold bleed air with the recirculation air, the system 400 utilizes the recirculation air, which is warm and moist, to level out the cold bleed air (e.g., raise the temperature). This leveled out bleed air, in turn, enters the low pressure side of the condenser 460, cools the bleed air on the high pressure side of the condenser 460, and is sent to condition the chamber 402.

When operating in the high pressure mode, it is possible for the air leaving the compressor 444 to exceed an auto-ignition temperature of fuel (e.g., 400 F for steady state and 450 F for transient). In this situation, air from an outlet of the first pass of the heat exchanger 420 is ducted by the valve V2 to an inlet of the compressor 444. This lowers an inlet temperature of the air entering the inlet of the compressor 444 and, as a result, the air leaving the compressor 444 is below the auto-ignition temperature of fuel.

The high pressure mode of operation can be used at flight conditions when engine pressure is adequate to drive the cycle or when a temperature of the chamber 402 demands it. For example, conditions, such as ground idle, taxi, take-off, climb, and hold conditions would have the air cycle machine 440 operating in the high pressure mode. In addition, extreme temperature high altitude cruise conditions could result in the air cycle machine 440 operating in the high pressure mode.

In a low pressure mode of operation, the bleed air from the inlet 401 bypasses the air cycle machine 440 via the valve V3 and goes directly through the first pass of the heat exchanger 420. Upon exiting the first pass, the bleed air then mixes at a mixing point with the recirculation air D2 provided by the fan 480 through the valves V6, V7 to produce mixed air. The mixing point in this case is downstream of the compressing device 440, which also can be referred to as downstream of the compressor 444. This mixing point can also be referred to as upstream of a second pass of the at least one heat exchanger 420. When applied to an air conditioning pack, the mixing point can be referred to as inside the pack. The mixed air enters the second pass of the heat exchanger 420, where it is cooled by ram air to the temperature required by the chamber 402 to produce cool air. The cool air then goes directly into the chamber 402 via the valve V9. Further, the chamber discharge air D1 is used to keep the air cycle machine 440 turning at a minimum speed. That is, the chamber discharge air D1 flowing from the chamber 402 through the valve V4 enters and expands across the turbine 445, so that work is extracted. This work is utilized to turn the air cycle machine 440 at, for example, a minimum speed of approximately 6000 rpm. The air exiting the turbine 445 is then dumped overboard through the shell 410.

The low pressure mode can be used at flight conditions where the pressure of the bleed air entering the air cycle machine 440 is greater than approximately 1 psi above the chamber pressure (e.g., conditions at cruise where altitudes are above 30,000 ft. and conditions at or near standard ambient day types).

In a boost pressure mode of operation, the bleed air from the inlet 401 enters the compressor 444, where it is compressed and heated. The compressed and heated air from the compressor 444 passes through the first pass of the heat exchanger 420 and then mixes at a mixing point with the recirculation air D2 provided by the fan 480 through the valves V6, V7 to produce mixed air. The mixing point in this case is downstream of the compressing device 440, which also can be referred to as downstream of the compressor 444. The mixing point can also be referred to as upstream of a second pass of the at least one heat exchanger 420. When applied to an air conditioning pack, the mixing point can be referred to as inside the pack. The mixed air enters the second pass of the heat exchanger 420, where it is cooled by ram air to the temperature required by the chamber 402 to produce cool air. The cool air then goes directly into the chamber 402 via the valve V9. Further, the cabin discharge air D1 is used to provide the energy to pressurize the bleed air entering the compressor 444. That is, the chamber discharge air D1 flowing from the chamber 402 through the valves V4 enters and expands across the turbine 445, so that work is extracted. The amount of work extracted by the turbine 445 is enough to turn the air cycle machine 440 at the speed required by the compressor 444 to raise a pressure of the bleed air to a value that can drive the bleed air through the heat exchanger 420 and into the chamber 402.

The boost pressure mode can be used at flight conditions where the pressure of the bleed air entering the air cycle machine 440 is as low as 2.5 psi below the chamber pressure (e.g., conditions at cruise where altitudes are above 30,000 ft. and conditions at or near standard ambient day types).

Figure 7:
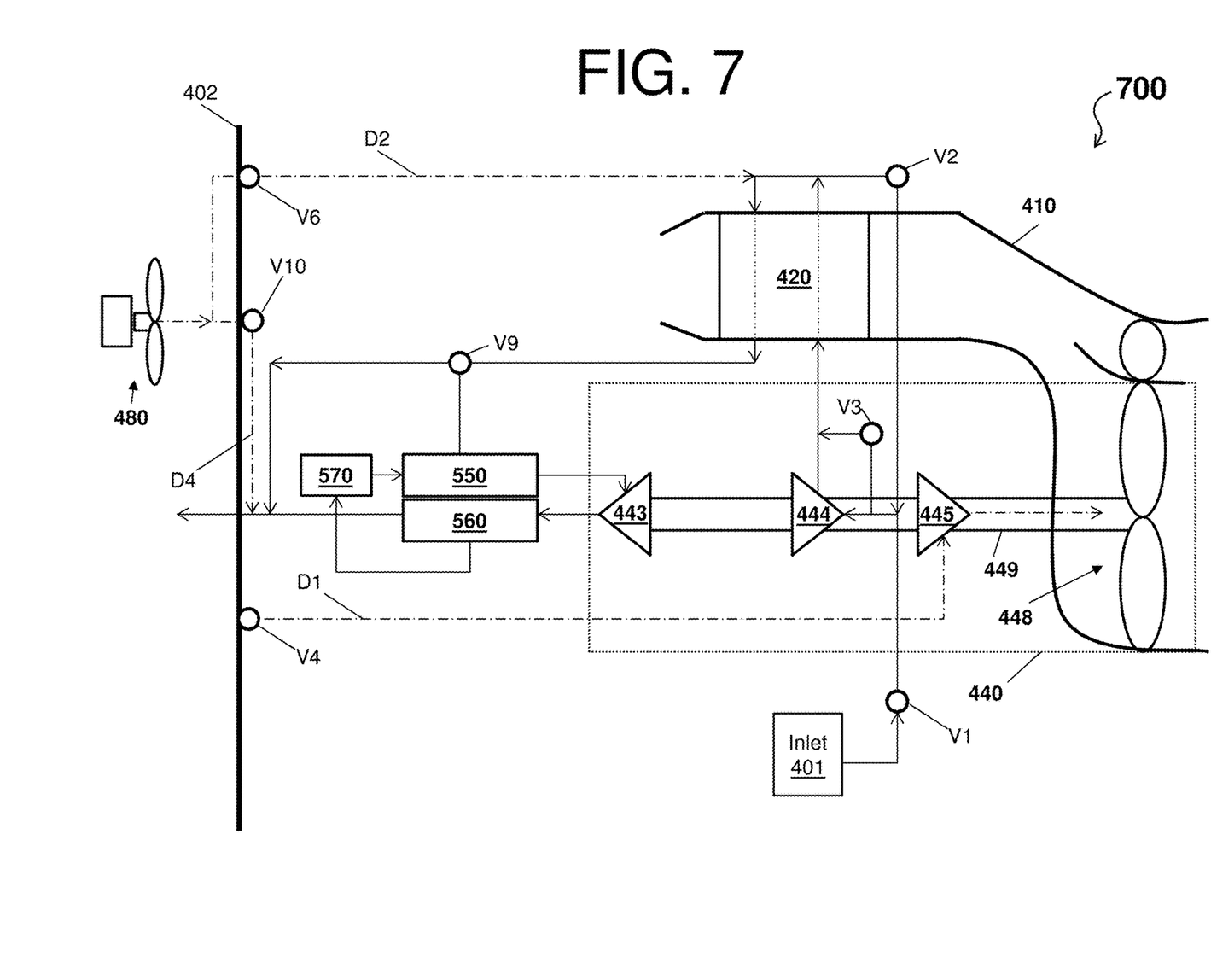
FIG. 7 is operation example of an environmental control system according to another embodiment.

The system 100 of FIG. 1 will now be described with reference to FIG. 7, in view of the aircraft example. FIG. 7 depicts a schematic of a system 700 (e.g., an embodiment of system 100) as it could be installed on an aircraft. Components of the system 700 that are similar to components of the systems 200, 500, and 600 have been reused for ease of explanation, by using the same identifiers, and are not reintroduced. An alternative component of the system 700 is a valve V10, along with the alternative paths depicted by the dot-dashed line D4.

In a high pressure mode of operation, high-pressure high-temperature air is received from the inlet 401 through the valve V1. The high-pressure high-temperature air enters the compressor 444. The compressor 444 pressurizes the high-pressure high-temperature and in the process heats it. This air then enters a first pass of the heat exchanger 420 and is cooled by ram air. The air exiting the first pass of the heat exchanger 420 then enters the second pass of the heat exchanger 420 and is further cooled to produce cool high pressure air. This cool high pressure air enters through the valve V9 into the reheater 550, where it is cooled; through the condenser 360, where it is cooled by air from the turbine 443; through the water extractor 570, where the moisture in the air is removed; and again into the reheater 550, where the air is heated to nearly an inlet temperature at the valve V9. The warm high pressure and now dry air enters the turbine 443, where it is expanded and work extracted. The work from the turbine 443 can drive both the compressor 444 and the fan 448. The fan 448 is used to pull ram air flow through the heat exchanger 420. After leaving the turbine 443, the cold air, typically below freezing, cools the warm moist air in the condenser 560. Downstream of the condenser 560, the cold air leaving the air cycle machine 440 mixes at a mixing point with the recirculation air D4 provided by the fan 480 through the valve V10 to produce mixed air. The mixing point in this case is downstream of the compressing device 440, which also can be referred to as downstream of the compressor 444 and/or downstream of the first turbine 443. This mixed air then sent to condition the chamber 402.

When operating in the high pressure mode, it is possible for the air leaving the compressor 444 to exceed an auto-ignition temperature of fuel (e.g., 400 F for steady state and 450 F for transient). In this situation, air from an outlet of the first pass of the heat exchanger 420 is ducted by the valve V2 to an inlet of the compressor 444. This lowers an inlet temperature of the air entering the inlet of the compressor 444 and, as a result, the air leaving the compressor 444 is below the auto-ignition temperature of fuel.

The high pressure mode of operation can be used at flight conditions when engine pressure is adequate to drive the cycle or when a temperature of the chamber 402 demands it. For example, conditions, such as ground idle, taxi, take-off, climb, and hold conditions would have the air cycle machine 240 operating in the high pressure mode. In addition, extreme temperature high altitude cruise conditions could result in the air cycle machine 240 operating in the high pressure mode.

In a low pressure mode of operation, the bleed air from the inlet 401 bypasses the air cycle machine 440 via the valve V3 and goes directly through the first pass of the heat exchanger 420. Upon exiting the first pass, the bleed air then mixes at a mixing point with the recirculation air D2 provided by the fan 480 through the valves V6, V10 to produce mixed air. The mixing point in this case is downstream of the compressing device 440, which also can be referred to as downstream of the compressor 444. This mixing point can also be referred to as upstream of a second pass of the at least one heat exchanger 420. The mixed air enters the second pass of the heat exchanger 420, where it is cooled by ram air to the temperature required by the chamber 402 to produce cool air. The cool air then goes directly into the chamber 402 via the valve V9. Further, the chamber discharge air D1 is used to keep the air cycle machine 440 turning at a minimum speed. That is, the chamber discharge air D1 flowing from the chamber 402 through the valve V4 enters and expands across the turbine 445, so that work is extracted. This work is utilized to turn the air cycle machine 440 at, for example, a minimum speed of approximately 6000 rpm. The air exiting the turbine 445 is then dumped overboard through the shell 410.

The low pressure mode can be used at flight conditions where the pressure of the bleed air entering the air cycle machine 440 is greater than approximately 1 psi above the chamber pressure (e.g., conditions at cruise where altitudes are above 30,000 ft. and conditions at or near standard ambient day types).

In a boost pressure mode of operation, the bleed air from the inlet 401 enters the compressor 444, where it is compressed and heated. The compressed and heated air from the compressor 444 passes through the first pass of the heat exchanger 420 and then mixes at a mixing point with the recirculation air D2 provided by the fan 480 through the valve V6 to produce mixed air. The mixing point in this case is downstream of the compressing device 440, which also can be referred to as downstream of the compressor 444. This mixing point can also be referred to as upstream of a second pass of the at least one heat exchanger 420. The mixed air enters the second pass of the heat exchanger 420, where it is cooled by ram air to the temperature required by the chamber 402 to produce cool air. The cool air then goes directly into the chamber 402 via the valve V9. Further, the cabin discharge air D1 is used to provide the energy to pressurize the bleed air entering the compressor 444. That is, the chamber discharge air D1 flowing from the chamber 402 through the valves V4 enters and expands across the turbine 445, so that work is extracted. The amount of work extracted by the turbine 445 is enough to turn the air cycle machine 440 at the speed required by the compressor 444 to raise a pressure of the bleed air to a value that can drive the bleed air through the heat exchanger 420 and into the chamber 402.

The boost pressure mode can be used at flight conditions where the pressure of the bleed air entering the air cycle machine 440 is as low as 2.5 psi below the chamber pressure (e.g., conditions at cruise where altitudes are above 30,000 ft. and conditions at or near standard ambient day types).

Aspects of embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the embodiments herein. For instance, the steps may be performed in a differing order or steps may be added, deleted or modified. All of these variations are considered a part of the claims.

While the preferred embodiment had been described, it will be understood that those skilled in the art, both now and in the future, may make various improvements and enhancements which fall within the scope of the claims which follow. These claims should be construed to maintain the proper protection.

What is claimed is:

1. A system of an aircraft, the system comprising:
   a fresh air inlet providing fresh air sourced from an engine or auxiliary unit;
   a cabin air inlet providing air sourced from a pressurized chamber of the aircraft;
   at least one heat exchanger; and
   a compressing device comprising a compressor, a first turbine, and a second turbine operably coupled by a shaft, the compressing device being in fluid communication with the fresh air inlet, the first turbine being located downstream of the compressor relative to a flow path of the fresh air, the second turbine being in fluid communication with the cabin air inlet, the at least one heat exchanger located downstream of the compressor relative to the flow path of the fresh air, the first turbine providing a primary power to drive the compressor by expanding the fresh air exhausted from the at least one heat exchanger, and the second turbine providing a supplemental power to drive the compressor by expanding the air received from the pressurized chamber,
   wherein an outlet of the at least one heat exchanger is in fluid communication with an inlet of the compressor and an inlet of the first turbine; and
   wherein the system is operable in a first mode where the fresh air is mixed with the air from the pressurized chamber at a first mixing point and in a second mode in which the fresh air is mixed with the air from the pressurized chamber at a second mixing point, wherein the first mixing point is arranged upstream from the at least one heat exchanger.

2. The system of claim 1, wherein the first mixing point is located downstream of the compressor.

3. The system of claim 1, wherein the first mixing point is located at an inlet of the at least one heat exchanger.

4. The system of claim 1, wherein the second mixing point is located downstream of the first turbine.

5. The system of claim 1, wherein the first mode is a boost pressure mode.

6. The system of claim 2, wherein the at least one heat exchanger comprises a plurality of passes by which the fresh air flows, the plurality of passes including a first pass and a second pass.

7. The system of claim 6, wherein the first mixing point is downstream of the first pass of the plurality of passes.

8. The system of claim 7, wherein the first mode is a boost pressure mode.

9. A system of an aircraft, the system comprising:
   a fresh air inlet providing fresh air sourced from an engine or auxiliary unit;
   a cabin air inlet providing air sourced from a pressurized chamber of the aircraft;
   at least one heat exchanger;
   a compressing device comprising a compressor, a first turbine, and a second turbine operably coupled by a shaft, the compressing device being in fluid communication with the fresh air inlet, the first turbine being downstream of the compressor relative to a flow path of the fresh air, the second turbine being in fluid communication with the cabin air inlet, the at least one heat exchanger being arranged downstream of the compressor relative to the flow path of the fresh air, the first turbine providing a primary power to drive the compressing device by expanding the fresh air after the fresh air has been exhausted from the at least one heat exchanger, and the second turbine providing a supplemental power to drive the compressing device by expanding the air received from the pressurized chamber,
   wherein the at least one heat exchanger comprises a plurality of passes including a first pass and a second pass relative to a flow of the fresh air, the first pass and the second pass of the at least one heat exchanger being located downstream from the compressor, wherein an outlet of the first pass of the at least one heat exchanger is arranged at an intermediate location of the at least one heat exchanger and is in fluid communication with an inlet of the compressor, and wherein an outlet of the second pass of the at least one heat exchanger is in fluid communication with an inlet of the first turbine.

10. The system of claim 9, being configurable to operate in at least two modes comprising a first mode and a second mode;

wherein, in the first mode, the fresh air is mixed with the air from the pressurized chamber at a first mixing point; and wherein, in the second mode, the fresh air is mixed with the air from the pressurized chamber at a second mixing point.

11. The system of claim 10, wherein the first mixing point is downstream of the compressor.

12. The system of claim 10, wherein the first mixing point is located at an inlet of the at least one heat exchanger.

13. The system of claim 9, wherein the first mixing point is downstream of the first pass of the plurality of passes.

14. The system of claim 10, wherein the first mode is a boost pressure mode.

* * * * *